(12) United States Patent
Yamashita

(10) Patent No.: US 9,154,663 B2
(45) Date of Patent: Oct. 6, 2015

(54) COMMUNICATION DEVICE AND METHOD FOR DECODING IMAGE DATA

(75) Inventor: Makoto Yamashita, Tokyo (JP)

(73) Assignee: Oki Data Corporation, Tokyo (JP)

( * ) Notice: Subject to any disclaimer, the term of this patent is extended or adjusted under 35 U.S.C. 154(b) by 345 days.

(21) Appl. No.: 13/536,027

(22) Filed: Jun. 28, 2012

(65) Prior Publication Data

US 2013/0016400 A1    Jan. 17, 2013

(30) Foreign Application Priority Data

Jul. 14, 2011    (JP) .................................. 2011-155764

(51) Int. Cl.
*H04N 1/327* (2006.01)
*H04N 1/00* (2006.01)

(52) U.S. Cl.
CPC ....... *H04N 1/32702* (2013.01); *H04N 1/00206* (2013.01)

(58) Field of Classification Search
None
See application file for complete search history.

(56) References Cited

U.S. PATENT DOCUMENTS

| | | | |
|---|---|---|---|
| 5,720,014 A * | 2/1998 | Ikeda et al. | 358/1.15 |
| 5,943,068 A * | 8/1999 | Ono et al. | 347/3 |
| 2003/0128402 A1* | 7/2003 | Tanimoto | 358/402 |
| 2004/0075597 A1* | 4/2004 | Thaly | 341/107 |
| 2004/0169875 A1* | 9/2004 | Yoshida et al. | 358/1.9 |
| 2004/0196500 A1* | 10/2004 | Ichiki | 358/1.15 |

FOREIGN PATENT DOCUMENTS

JP    2003-069834 A    3/2003

OTHER PUBLICATIONS

International Telecommunication Union, ITU-T T.30, Sep. 2005.*
International Telecommunication Union, ITU-T T.82, Mar. 1993.*
International Telecommunication Union, ITU-T T.85, Aug. 1995.*

* cited by examiner

*Primary Examiner* — Nicholas Pachol
(74) *Attorney, Agent, or Firm* — Panitch Schwarze Belisario & Nadel LLP

(57) ABSTRACT

A communication device has an interface for receiving coded image data, and a decoder for decoding the received image data. The interface receives a first signal including a first parameter of a coding system by which the image data are coded and then receives a second signal including a second parameter of the coding system. The decoder decodes the coded image data according to the second parameter, regardless of whether the second parameter is consistent with the first parameter or not.

9 Claims, 12 Drawing Sheets

FIG. 4

| DCS bit 79 | 0 |
|---|---|
| STRIPE SIZE L0 | 128 |

FIG. 5

| DCS bit 79 | 0 |
|---|---|
| STRIPE SIZE L0 | 4294967295 |

COMMUNICATION DEVICE AND METHOD FOR DECODING IMAGE DATA

BACKGROUND OF THE INVENTION

1. Field of the Invention

The present invention relates to a communication device and a communication method.

2. Description of the Related Art

Facsimile communication by the transmission of image data over public switched telephone networks (PSTNs) is a known art. There are various standards about a communication method in facsimile communication. For example, a coding method developed by the Joint Bi-level Image Experts Group (JBIG) for use in facsimile communication is incorporated into the Telecommunication Standardization Sector of the International Telecommunication Union (ITU-T) recommendations T.82 and T.85. Procedures of facsimile communication are standardized in ITU-T recommendation T.30.

Facsimile machines can transmit and receive image data correctly when facsimile communication is carried out according to these standards. An exemplary facsimile machine that makes a connection to the PSTNs, transmits facsimile image data coded by the JBIG method, decodes received facsimile image data that have been coded by the JBIG method and prints facsimile images according to the decoded data is described by Hanada et al. in Japanese Patent Application Publication No. 2003-69834.

Although facsimile communication is normally carried out according to the recommended standards, many different types of facsimile machines are connected to the PSTNs, so a facsimile machine that complies with the recommendations sometimes finds itself communicating with a non-compliant facsimile machine. When facsimile communication departs from the recommended standards, it can be difficult to decode the received data correctly and print the intended facsimile image.

SUMMARY OF THE INVENTION

An object of the present invention is therefore to enable the intended facsimile image to be printed.

The invention provides a novel communication device having an interface for receiving coded image data and a decoder for decoding the coded image data. The interface receives a first signal including a first parameter of a coding system by which the coded image data are coded and then receives a second signal including a second parameter of the coding system by which the coded image data are coded. The decoder decodes the coded image data according to the second parameter, regardless of whether or not the first and second parameters are mutually consistent.

In the specific examples shown below, the novel communication device can print the intended image.

BRIEF DESCRIPTION OF THE DRAWINGS

In the attached drawings:

FIG. 4 shows exemplary values of DCS bit 79 and stripe size parameter LO compliant with ITU-T recommendations T.30 and T.85 in the first embodiment;

FIG. 5 shows exemplary values of DCS bit 79 and stripe size parameter LO not compliant with ITU-T recommendations T.30 and T.85 in the first embodiment;

DETAILED DESCRIPTION OF THE INVENTION

Figure 1:
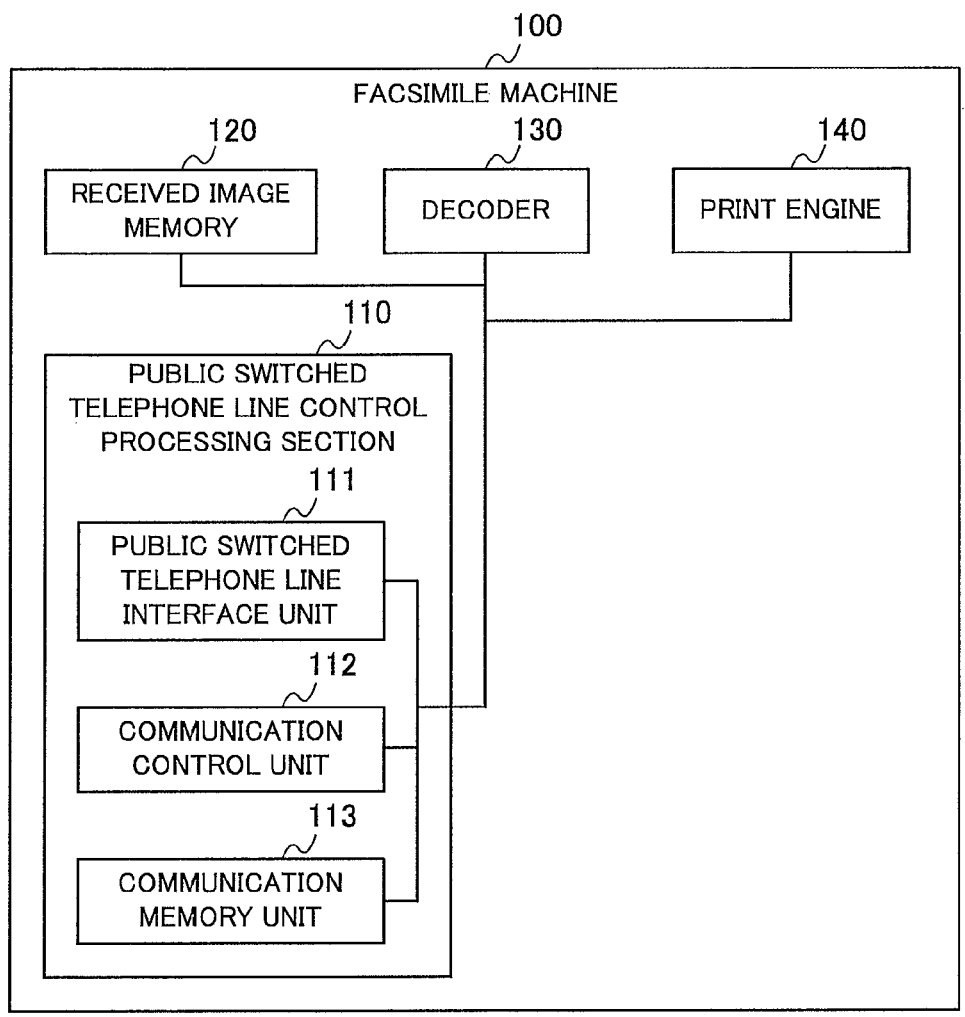
FIG. 1 is a block diagram schematically showing the structure of a facsimile machine in a first embodiment of the invention.

Embodiments of the invention will now be described with reference to the attached drawings, in which like elements are indicated by like reference characters.

First Embodiment

Referring to FIG. 1, the facsimile machine 100 in the first embodiment includes a public switched telephone line control processing section 110, a received image memory 120, a decoder 130, and a print engine 140.

The public switched telephone line control processing section 110 carries out facsimile communication over public telephone lines. The public switched telephone line control processing section 110 in this embodiment includes a public switched telephone line interface unit 111, a communication control unit 112, and a communication memory unit 113.

The public switched telephone line interface unit 111 is an interface unit for interfacing the facsimile machine 100 with a public telephone line in order to transmit and receive data. The public switched telephone line interface unit 111 transmits and receives, for example, the various signals and coded image data necessary for facsimile communication. It will be assumed that the coded image data are coded by the JBIG facsimile coding system.

The communication control unit 112 controls facsimile communication in the facsimile machine 100. The communication control unit 112 in this embodiment controls facsimile communication by a procedure complying with ITU-T recommendation T.30. In receiving communication, the communication control unit 112 also causes the communication memory unit 113 to store parameters related to the coding system selected by the transmitting facsimile device to which the facsimile machine 100 is connected via the public telephone line.

The communication memory unit 113 stores data required in facsimile communication. For example, the communication memory unit 113 stores parameters related to the coding system selected by a transmitting facsimile device to which the facsimile machine 100 is connected via the public telephone line.

The received image memory 120 stores the coded image data received by the public switched telephone line interface unit 111.

The decoder 130 is a decoding unit for reading the coded image data stored in the received image memory 120, generating an image data by decoding the coded image data to obtain the original image data, and passing the generated image data to the print engine 140. The decoder 130 in this embodiment decodes the coded image data according to the JBIG facsimile decoding system.

On the basis of the image data received from the decoder 130, the print engine 140 is a printing unit for printing images on recording paper.

Figure 2:
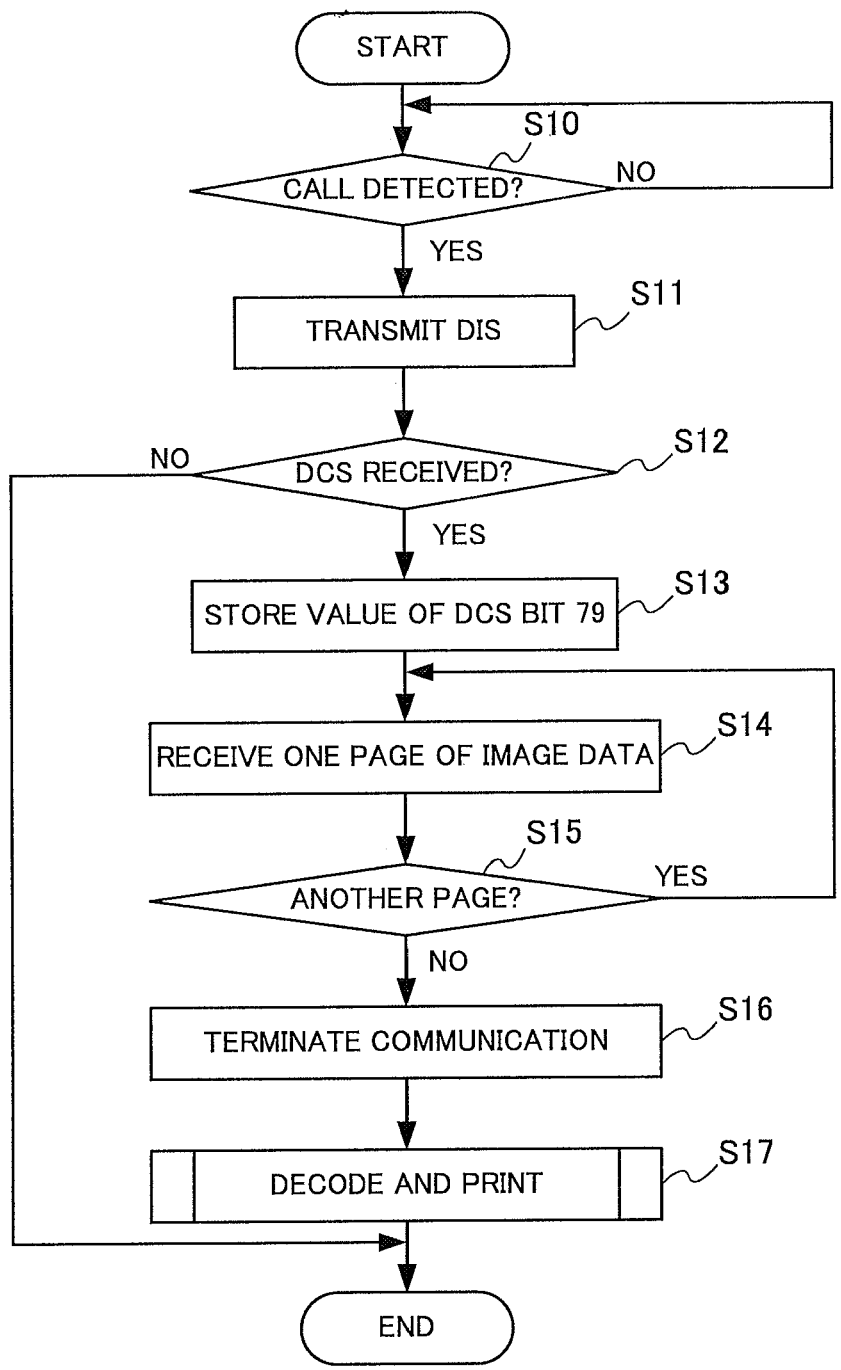
FIG. 2 is a flowchart illustrating the receiving procedure followed by the facsimile machine in the first embodiment.

FIG. 2 shows the receiving sequence in the facsimile machine 100 according to the first embodiment.

When the communication control unit 112 finds the public switched telephone line interface unit 111 receiving a call from a facsimile machine on a public switched telephone network and detects the call (Yes in step S10), it transmits a digital identification signal (DIS) to the calling facsimile machine (referred to below as the transmitting facsimile machine) to start facsimile communication (step S11). A DIS is a signal defined in ITU-T recommendation T.30 indicating all capabilities of the facsimile machine 100.

When the public switched telephone line interface unit 111 receives a digital command signal (DCS) from the transmitting facsimile machine (Yes in step S12), the communication control unit 112 acquires the value of bit 79 in the DCS and stores this value in the communication memory unit 113 (step S13). The DCS is a signal indicating which ones of the capabilities indicated by the DIS have been selected for use by the transmitting facsimile machine. DCS bit 79 is an option stripe size flag that indicates whether a default stripe size is used as the basic unit of data in coding: the value '0' means that the default stripe size is used; the value '1' means that another stripe size is used. In the context of this embodiment, the value of DCS bit 79 is a first parameter related to the coding system, especially to the basic unit in coding.

When the public switched telephone line interface unit 111 receives one page of coded image data, the communication control unit 112 causes the received image memory 120 to store the coded image data (step S14). The communication control unit 112 also causes the received image memory 120 to store header information received with the coded image data.

Next, the communication control unit 112 decides whether or not there is another page of coded image data (step S15). If there is another page (Yes in step S15), the processing returns to step S14; if there is no further page (No in step S15), the processing proceeds to step S16.

In step S16, the communication control unit 112 carries out processing to terminate facsimile communication.

The communication control unit 112 then issues commands to the decoder 130 to decode the received coded image data, and to the print engine 140 to print the decoded image data. In response, the decoder 130 and print engine 140 carry out decoding and printing processing, respectively (step S17).

Figure 3:
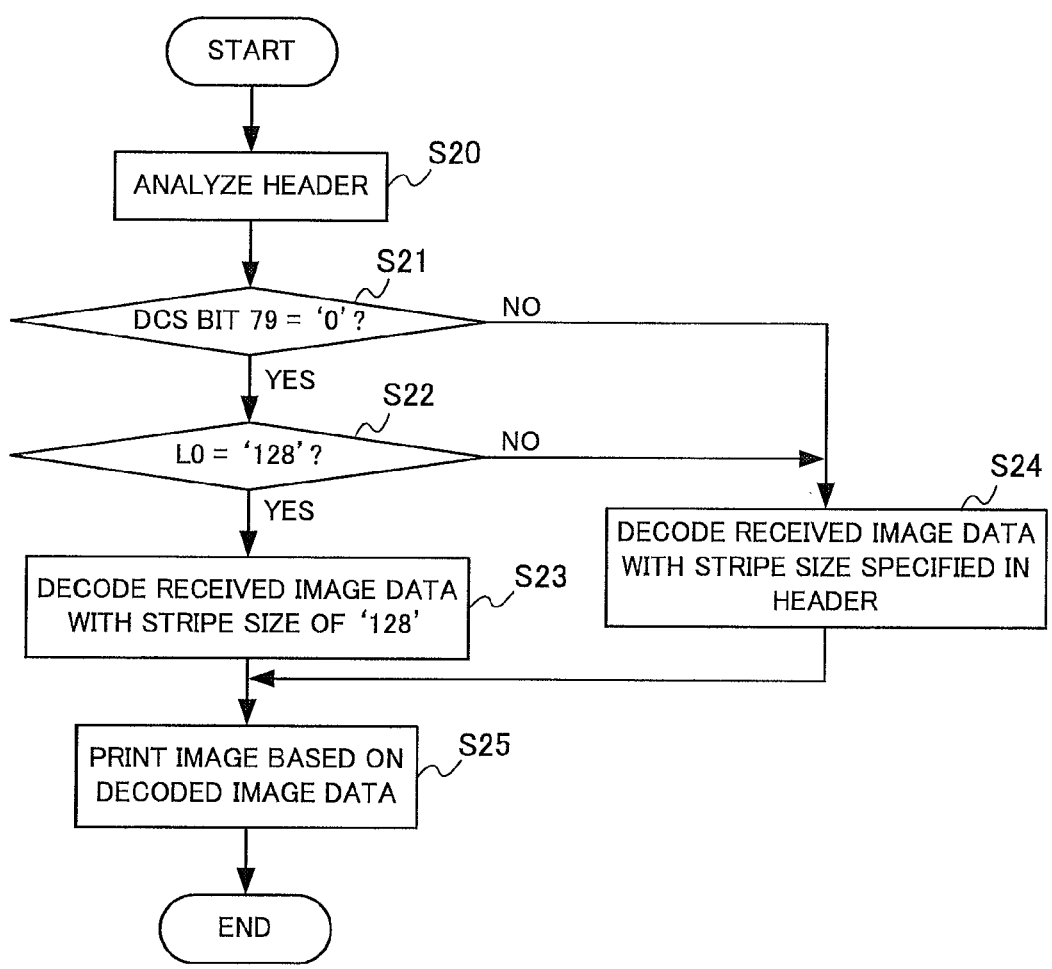
FIG. 3 is a flowchart illustrating the decoding and printing procedure followed by the facsimile machine in the first embodiment.

The decoding and printing procedure in step S17 in FIG. 2 is illustrated in the flowchart in FIG. 3.

First, the decoder 130 analyzes the header information of the coded image data stored in the received image memory 120 (step S20).

Next, the decoder 130 decides whether or not the value of DCS bit 79 stored in the communication memory unit 113 is zero ('0') (step S21). If the value is zero (Yes in step S21), the processing proceeds to step S22; if the value is not zero (No in step 21), the processing proceeds to step S24.

In step 22, the decoder 130 decides whether or not the value of the stripe size parameter L0 is '128'. If the L0 value is '128' (Yes in step S22), the processing proceeds to step S23; if the L0 value is not '128' (No in step S22), the processing proceeds to step S24. In the JBIG algorithm, the image data are segmented into equal-sized horizontal stripes, each including a given number of scanning lines, and the coding processes are carried out one stripe at a time. The stripe size parameter L0 is a parameter included in the header information of the image data to specify an optional stripe size, giving the number of horizontal scanning lines per stripe. In other words, the stripe size parameter L0 is a second parameter related to the coding system, especially to the basic unit in coding.

In step S23, the decoder 130 decodes the coded image data by using the stripe size value '128', and passes the decoded image data to the print engine 140.

In step S24, the decoder 130 decodes the coded image data by using the stripe size given by the L0 parameter in the header information, and passes the decoded image data to the print engine 140.

The print engine 140 then prints an image according to the decoded image data received from the decoder 130 in step S23 or S24 (step S25).

FIG. 4 illustrates exemplary values of DCS bit 79 and the stripe size parameter LO compliant with ITU-T recommendations T.30 and T.85. In ITU-T recommendations T.30 and T.85, when the value of DCS bit 79 is zero ('0'), the value of the stripe size parameter LO given in the header information of the coded image data is '128'. In this case, decoding is carried out in step S23 in. FIG. 3 and printing is carried out in step S25.

FIG. 5 illustrates exemplary values of DCS bit 79 and the stripe size LO that are not compliant with ITU-T recommendations T.30 and T.85. In this example, although the value of DCS bit 79 is zero, the value of the stripe size parameter L0 included in the header information of the coded image data is '4294967295' and the image has been coded using this stripe size. In cases like this, conventional facsimile machines usually discard the coded image data, treating the data as have a coding error, or decode the image data by using '128' as the stripe size, causing a decoding error. In the latter case, either a distorted image with a decoding error is printed, or a plain sheet of paper is ejected with no printed image. In this situation, the facsimile machine 100 according to the present embodiment decodes the coded image data correctly in step S24 in FIG. 3 and prints the image in step S25 in FIG. 3.

As described above, with the facsimile machine 100 in this embodiment, even if the value of DCS bit 79 and the value of the stripe size parameter LO given in the header information of the coded image data are mutually contradictory, i.e., mutually inconsistent, the coded image can be decoded and the intended image can be printed correctly.

When the facsimile machine disclosed by Hanada et al. in JP 2003-69834, for example, receives JBIG coded image data from a facsimile machine not compliant with the ITU-T recommendations in the manner described above, it cannot correctly decode the coded image data, and accordingly cannot correctly print the image. In contrast, the facsimile machine 100 in this embodiment can print the image correctly, even though the coded image data were transmitted from a machine not compliant with the ITU-T recommendations.

Second Embodiment

Figure 6:
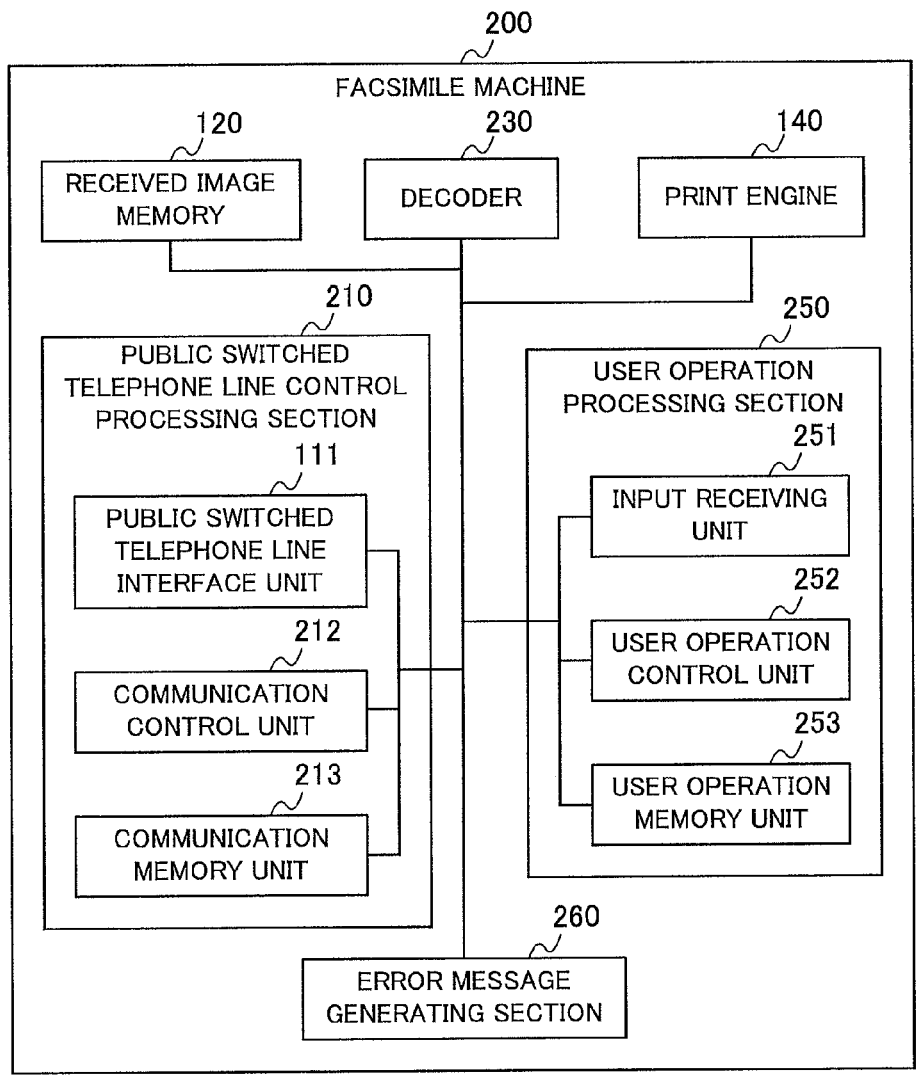
FIG. 6 is a block diagram schematically showing the structure of a facsimile machine in a second embodiment of the invention.

Referring to FIG. 6, the facsimile machine 200 in the second embodiment includes a public switched telephone line control processing section 210, a received image memory 120, a decoder 230, a print engine 140, a user operation processing section 250, and an error message generating section 260. This facsimile machine 200 differs from the facsimile machine 100 in the first embodiment in regard to the processing in the public switched telephone line control processing section 210 and decoder 230, and in the inclusion of the user operation processing section 250 and error message generating section 260.

The public switched telephone line control processing section 210 carries out facsimile communication over public telephone lines. The public switched telephone line control processing section 210 in this embodiment includes a public switched telephone line interface unit 111, a communication control unit 212, and a communication memory unit 213. The public switched telephone line control processing section 210 in the second embodiment differs from the public, switched telephone line control processing section 110 in the first embodiment in regard to the processing carried out by the communication control unit 212 and the information stored in the communication memory unit 213.

The communication control unit 212 carries out the same processing as in the first embodiment, but when a facsimile transmission is received, it also causes the communication memory unit 213 to store the telephone number of the transmitting facsimile machine and the date and time at which the transmission was received from the transmitting facsimile machine. The communication control unit 212 also performs transmission of error messages generated in the error message generating section 260 to the transmitting facsimile machine. The communication control unit 212 in this embodiment follows the transmission control procedure defined in ITU-T recommendation T.30 in the transmission of the error messages.

The communication memory unit 213 stores data required in facsimile communication. For example, the communication memory unit 213 stores parameters related to the coding system selected by a transmitting facsimile machine connected to the public telephone line, the telephone number of the transmitting facsimile machine, and the date and time of signal reception from the transmitting facsimile machine.

The decoder 230 carries out the same processing as in the first embodiment, and in addition, when the value of DCS bit 79 and the value of the stripe size parameter LO given in the header information of the coded image data are mutually inconsistent, it checks an error notification setting that has been made in the user operation processing section 250. If the error notification setting is 'On', the decoder 230 then issues a command to the error message generating section 260 to generate an error message to notify the transmitting facsimile machine of the error.

The user operation processing section 250 receives input of settings from the user of the facsimile machine 200 and holds the input settings. For example, the user operation processing section 250 receives input of a setting to indicate whether or not to transmit an error message to report the occurrence of an error in facsimile machine 200 to the transmitting facsimile machine, and holds this input setting as an error notification setting. The user operation processing section 250 includes an input receiving unit 251, a user operation control unit 252, and a user operation memory unit 253.

The input receiving unit 251 receives input of operations from the user. The input receiving unit 251 may be implemented as, for example, input buttons or a touch panel.

The user operation control unit 252 carries out processing corresponding to operations input by the user and received by the input receiving unit 251. For example, the user operation control unit 252 causes the user operation memory unit 253 to store an error notification setting that the input receiving unit 251 receives when the setting is input by the user.

The user operation memory unit 253 stores setting information that is set when the input receiving unit 251 receives corresponding input. For example, the user operation memory unit 253 stores the error notification setting that the input receiving unit 251 receives. In the following description, the error notification setting will denote 'On', meaning to transmit an error message, or 'Off' meaning not to transmit an error message.

In response to a command from the decoder 230, the error message generating section 260 generates an error message, and passes the generated error message to the public switched telephone line control processing section 210.

Figure 7:
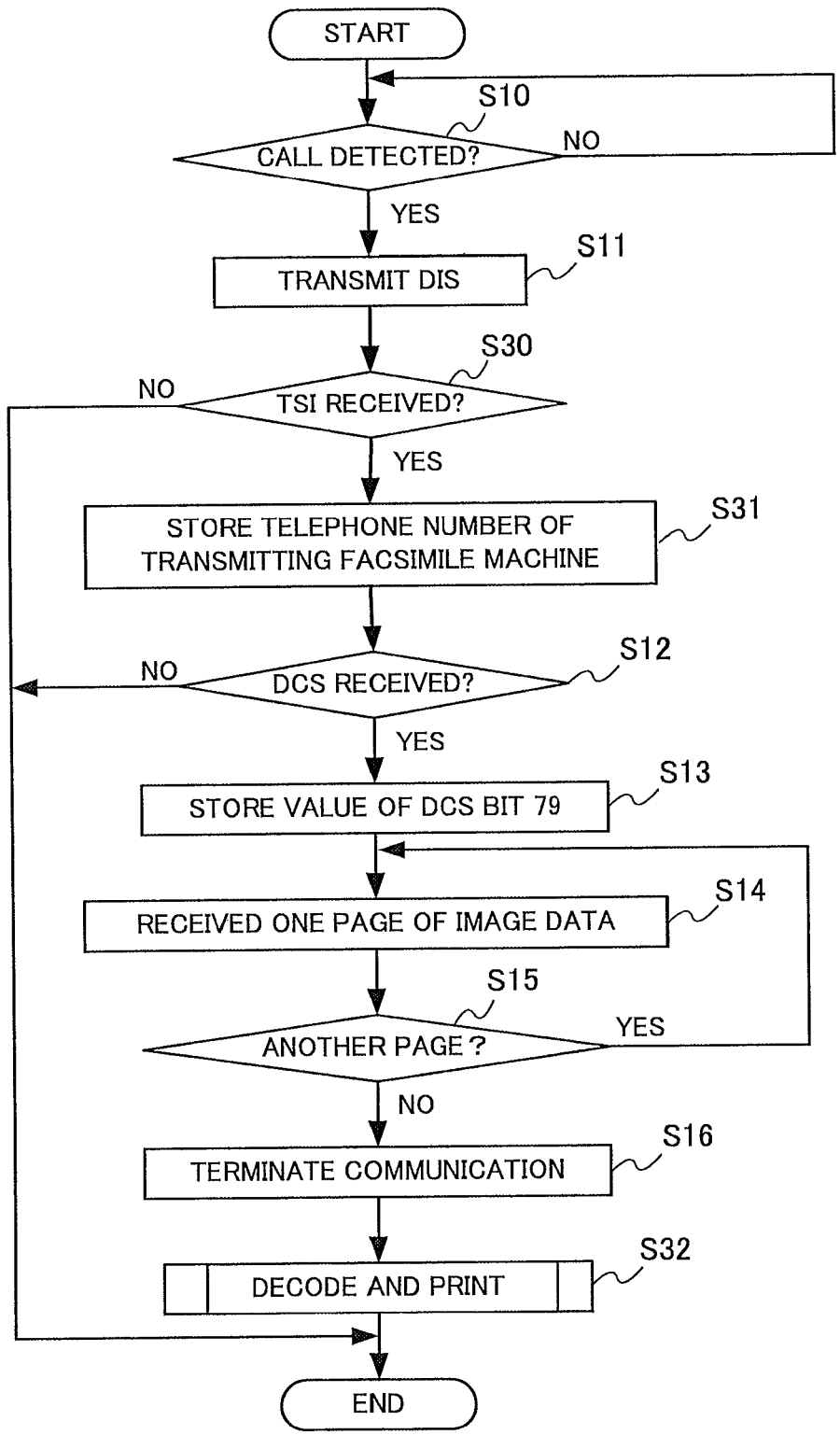
FIG. 7 is a flowchart illustrating the receiving procedure followed by the facsimile machine in the second embodiment.

FIG. 7 is a flowchart illustrating the receiving sequence in the facsimile machine 200 according to the second embodiment. The processing in steps S10 to S16 is the same as the processing in the steps with the same reference characters in FIG. 2.

In the second embodiment, after DIS transmission in step S11, the communication control unit 212 carries out the processing in step S30.

In step S30, when the public switched telephone line interface unit 111 receives a transmitting subscriber identification (TSI) signal from the transmitting facsimile machine (Yes in step S30), the communication control unit 212 causes the communication memory unit 213 to store the telephone number included in the TSI and, in association with the telephone number, the date and time of reception of the TSI signal (step S31). After step S31, the communication control unit 212 proceeds with steps S12 to S16. The TSI signal is a signal indicating the telephone number of the transmitting facsimile machine.

After the processing in step S16, the communication control unit 212 proceeds to step S32.

In step S32, the communication control unit 212 issues commands to the decoder 230 to decode the received coded image data, and to the print engine 140 to print the decoded image data. In response, the decoder 230 and print engine 140 carry out decoding and printing processing respectively.

Figure 8:
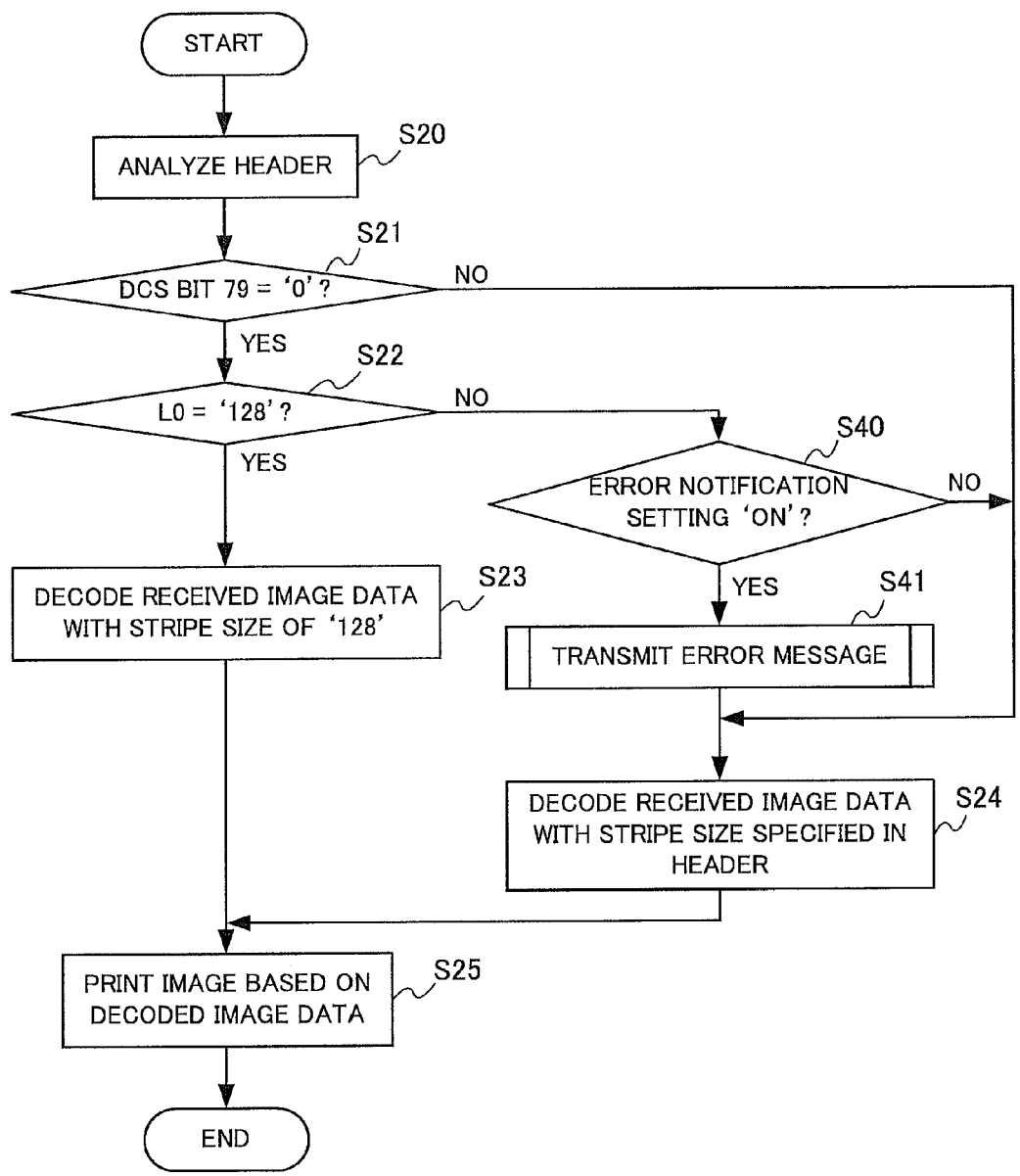
FIG. 8 is a flowchart illustrating the decoding and printing procedure followed by the facsimile machine in the second embodiment.

The decoding and printing procedure carried out in step S32 in FIG. 7 is illustrated in the flowchart in FIG. 8. The processing in steps S20 to S25 is the same as the processing in the steps with the same reference characters in FIG. 3.

In step S22, if the value of the stripe size parameter LO given in the header information is not '128' (No in step S22), the decoder 230 proceeds to the processing in step S40.

In step S40, the decoder 230 checks whether or not the error notification setting stored in the user operation memory unit 253 is 'On'. If the error notification setting is 'On' (Yes in step S40), the decoder 230 proceeds to the processing in step S41; if the error notification setting is 'Off' (No in step S40), the decoder 230 proceeds to the processing in step S24.

In step S41, the decoder 230 issues a command to the error message generating section 260 to transmit an error message. In response, the error message generating section 260 generates the error message and passes it to the public switched telephone line control processing section 210 for transmission. After the processing in step S41, the decoder 230 proceeds to the processing in step S24.

Figure 9:
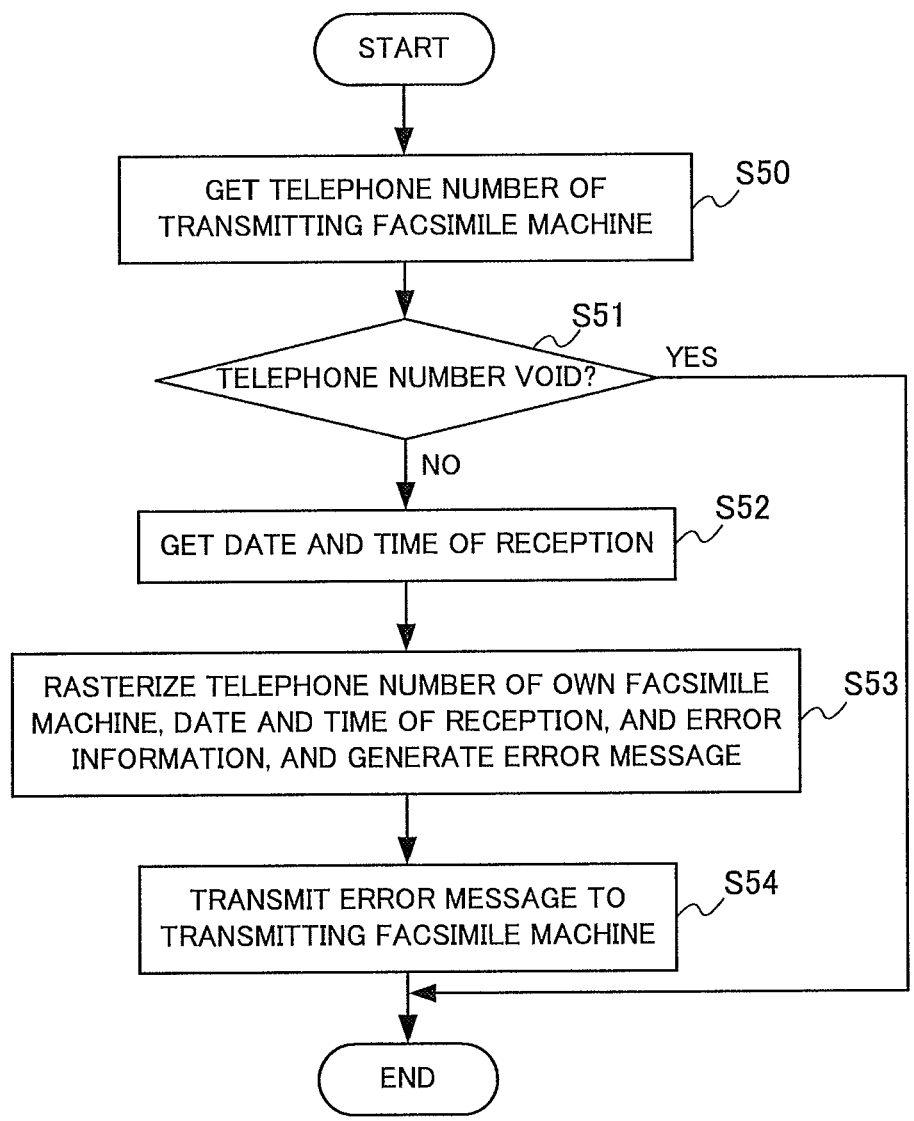
FIG. 9 is a flowchart illustrating the error message transmission procedure followed by the facsimile machine in the second embodiment.

The error message transmission procedure in step S41 in FIG. 8 is illustrated in the flowchart in FIG. 9.

First, the error message generating section 260 gets the telephone number of the transmitting facsimile machine, which is stored in the communication memory unit 213 (step S50).

Next, the error message generating section 260 decides whether or not the telephone number acquired in step S50 is void (step S51). ITU-T recommendation T.30 allows all TSI digits to be space characters. Step S51 prevents the originating of calls to such void (invalid) telephone numbers. If the telephone number is void (Yes in step S51), the error message generating section 260 terminates the error message transmission procedure; if the telephone number is not void (No in step S51), the error message generating section 260 proceeds to step S52.

In step S52, the error message generating section 260 gets the date and time stored in the communication memory unit 213.

Next, the error message generating section 260 rasterizes the telephone number of its own facsimile machine 200, the date and time acquired in step S52, and a message describing the error, and generates the error message (step S53).

Figure 10:
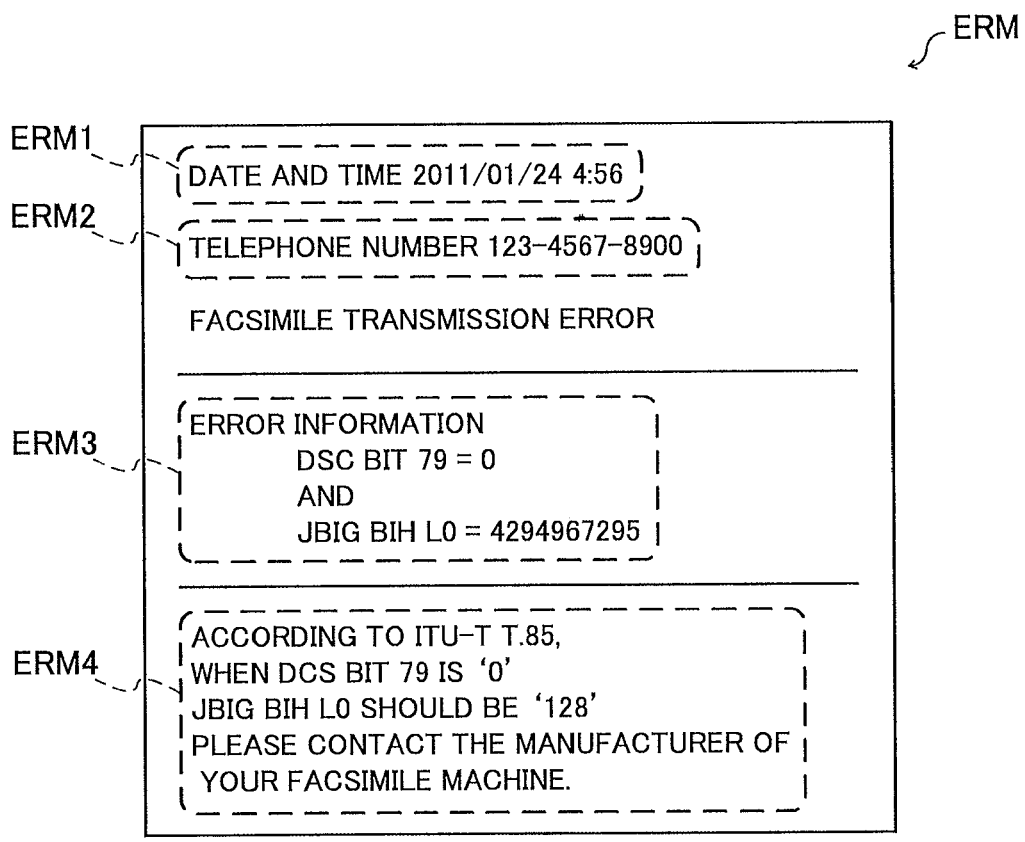
FIG. 10 schematically shows an exemplary error message generated by the error message generating section in the second embodiment.

An exemplary error message generated by the error message generating section 260 is shown in FIG. 10. This error message ERM includes the reception date and time ERM1, the telephone number ERM2 of the receiving facsimile machine 200, information ERM3 describing the error, and other related information ERM4. In the example in FIG. 10, the other related information ERM4 is a message describing a violation of ITU-T recommendations.

Referring again to FIG. 9, after generating the error message in step S53, the error message generating section 260 issues a command to the communication control unit 212 to transmit the error message generated in step S53 to the telephone number acquired in step S50. In response, the communication control unit 212 transmits the error message (step S54).

As described above, the facsimile machine 200 in the second embodiment can transmit error messages to transmitting facsimile machines that encourage the transmitting party to check and update or upgrade the transmitting facsimile machine, thereby providing improved usability for the transmitting party as well as the receiving party.

Third Embodiment

Figure 11:
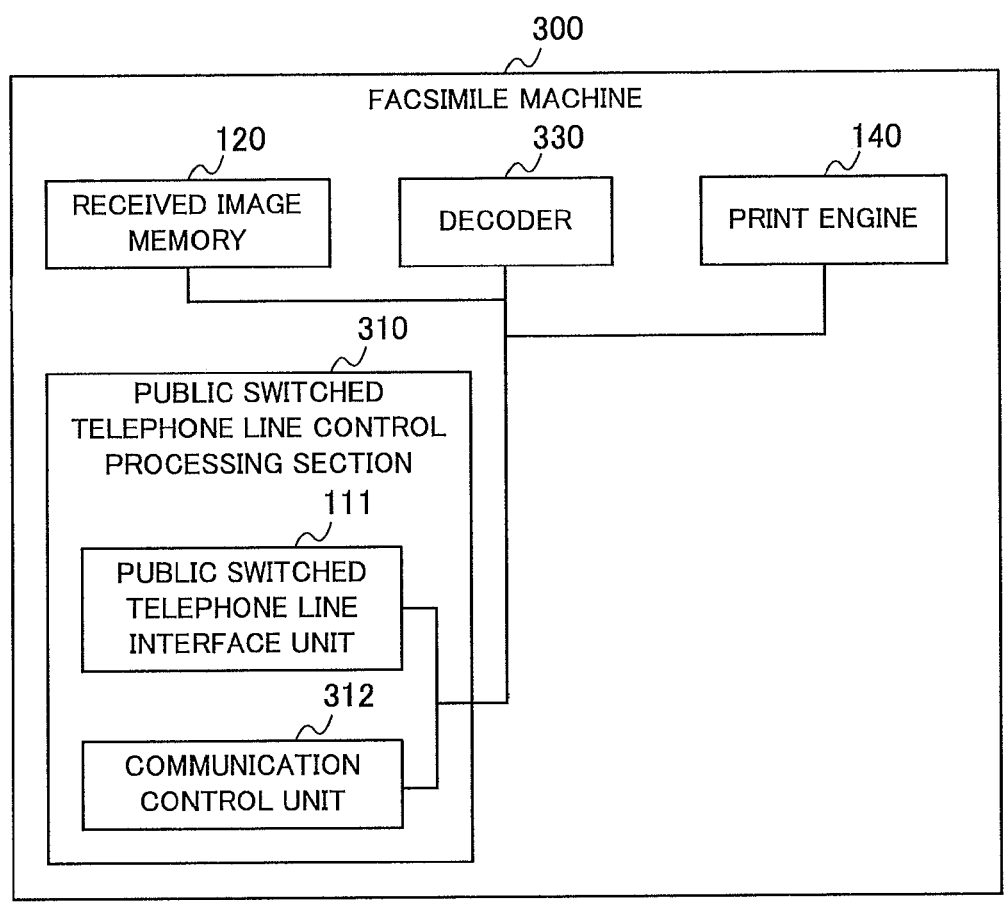
FIG. 11 is a block diagram schematically showing the structure of a facsimile machine in a third embodiment of the invention.

Referring to FIG. 11, the facsimile machine 300 in the third embodiment includes a public switched telephone line control processing section 310, a received image memory 120, a decoder 330, and a, print engine 140. This facsimile machine 300 differs from the facsimile machine 100 in the first embodiment in regard to the processing in the public switched telephone line control processing section 310 and decoder 330.

The public switched telephone line control processing section 310 carries out facsimile communication over public telephone lines. The public switched telephone line control processing section 310 includes a public switched telephone line interface unit 111 and a communication control unit 312. The public switched telephone line control processing section 310 in the third embodiment differs from the public switched telephone line control processing section 110 in the first embodiment in regard to the processing in the communication control unit 312 and in the omission of the communication memory unit 113.

The communication control unit 312 controls facsimile communication in the facsimile machine 300. The communication control unit 312 in this embodiment controls facsimile communication by a procedure complying with ITU-T recommendation T.30, as in the first embodiment. The difference from the first embodiment is that the communication control unit 312 does not perform processing which stores parameters related to the coding system selected by a transmitting facsimile device connected to the public telephone line.

The decoder 330 reads coded image data stored in the received image memory 120, decodes the coded image data, and generates image data, as in the first embodiment. The difference from the first embodiment is that the decoder 330 decodes the coded image data according to the value of the stripe size parameter L0 in the header information of the coded image data without questioning whether or not the value of DCS bit 79 and the value of the stripe size parameter L0 are mutually consistent. In other words, the decoder 330 decodes the coded image data on the basis of the value of the stripe size parameter L0 without checking whether the L0 value and the value of DCS bit 79 are consistent or inconsistent.

Figure 12:
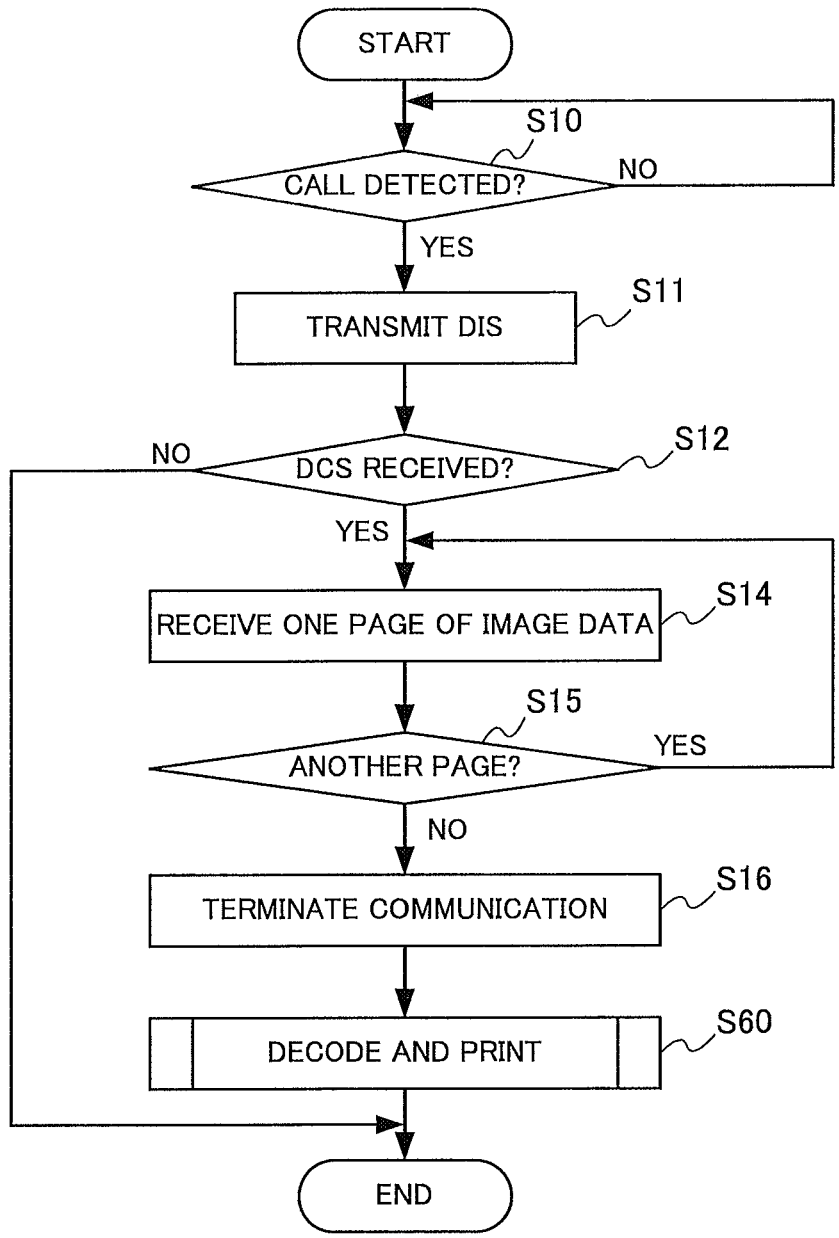
FIG. 12 is a flowchart illustrating the receiving procedure followed by the facsimile machine in the third embodiment.

FIG. 12 illustrates the receiving procedure in the facsimile machine 300 in the third embodiment in flowchart form. The processing in steps S10 to S12 and S14 to S16 is the same as the processing in the steps with the same reference characters in FIG. 2.

In FIG. 12, when the communication control unit 312 receives a DCS command (Yes in step S12), it proceeds to step S14 without storing the value of DCS bit 79.

After carrying out the processing in step S16, the communication control unit 312 proceeds to step S60.

In step S60, the communication control unit 312 issues commands to the decoder 330 to decode the received coded image data, and to the print engine 140 to print the decoded image data. In response, the decoder 330 and print engine 140 carry out decoding and printing processing respectively.

Figure 13:
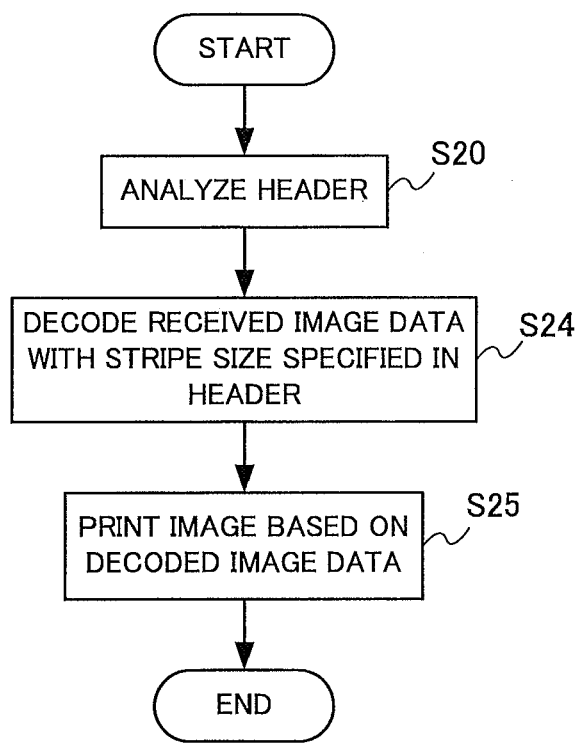
FIG. 13 is a flowchart illustrating the decoding and printing procedure followed by the facsimile machine in the third embodiment.

The flowchart in FIG. 13 illustrates the decoding and printing procedure in step S26 in FIG. 12. The processing in steps S20, S24, and S25 is the same as the processing in the steps with the same reference characters in FIG. 3.

After analyzing the header information of the coded image data stored in the received image memory 120, the decoder 330, without determining the consistency or inconsistency of the value of DCS bit 79 and the value of the stripe size parameter L0 in the header information, decodes the coded image data by using the stripe size parameter L0 given in the header information.

As described above, the facsimile machine 300 in this embodiment decodes and prints coded image data according to the stripe size L0 given in the header information, regardless of whether or not the value of DCS bit 79 and the value of the stripe size L0 are mutually consistent.

The invention is not limited to the facsimile machines 100, 200, 300 to which the invention is applied in the embodiments described above. For example, the invention may be used in a multifunction device having a facsimile communication function and other functions.

The embodiments described above use a transmitting procedure complying with ITU-T recommendation T.30, but it is also possible to use the real-time Internet facsimile transmission procedure defined in ITU-T recommendation T.38, or an electronic mail communication procedure.

Those skilled in the art will recognize that further variations are possible within the scope of the invention, which is defined in the appended claims.

What is claimed is:

1. A facsimile communication device comprising:
   an interface unit for receiving:
      a signal including bit 79 of a DCS command defined in ITU-T recommendation T.30, the bit 79 of the DCS command indicating a parameter related to a first stripe size value; and
      coded image data including a second stripe size value; and
   a decoder configured to:
      decide whether the parameter and the second stripe size value are mutually consistent, and
      decode the coded image data; wherein
   the decoder determines that the parameter and the second stripe size value are mutually inconsistent when the parameter is a value '0' and the second stripe size value is different from a value '128' and decodes the coded image data according to the second stripe size value, even when the parameter and the second stripe size value are mutually inconsistent.

2. The facsimile communication device of claim 1, wherein the coded image data are coded by the JBIG system defined in ITU-T recommendations T.82 and T.85.

3. The facsimile communication device of claim 1, further comprising:
   an error message generating section for generating an error message when the parameter and the second stripe size value are mutually inconsistent; and
   a communication control unit for carrying out processing to transmit the error message through the interface to a device that transmitted the coded image data.

4. The facsimile communication device of claim 3, wherein the communication control unit carries out processing to transmit the error message to a telephone number given in a TSI command defined in ITU-T recommendation T.30.

5. The facsimile communication device of claim 3, wherein the communication control unit carries out processing to transmit the error message according to a facsimile transmission procedure defined in ITU-T recommendation T.30.

6. The facsimile communication device of claim 1, further comprising a printing unit for printing an image based on the image data decoded by the decoder.

7. A facsimile communication method comprising:
   receiving, by an interface unit, a signal including bit 79 of a DCS command defined in ITU-T recommendation T.30, the bit 79 of the DCS command indicating a parameter related to a first stripe size value;
   receiving, by the interface unit coded image data including a second stripe size value after receiving the signal;
   deciding, by a decoder, that the parameter and the second stripe size value are mutually inconsistent when the parameter is a value '0' and the second stripe value is different from a value '128'; and
   decoding, by the decoder, the coded image data according to the second stripe size value, even when the parameter and the second stripe size value are mutually inconsistent.

8. The facsimile communication method of claim 7, further comprising:
   generating an error message when the parameter and second stripe size value are decided to be mutually inconsistent; and
   carrying out processing to transmit the error message to a device that transmitted the coded image data.

9. The facsimile communication method of claim 7, further comprising printing an image based on the decoded image data.

* * * * *